US008931951B2

(12) United States Patent
Thomas et al.

(10) Patent No.: US 8,931,951 B2
(45) Date of Patent: Jan. 13, 2015

(54) TIME-TEMPERATURE INDICATOR

(75) Inventors: John A. Thomas, Ellicott City, MD (US); Jason E. Tiffany, Columbia, MD (US); Lawrence W. Hunter, Ellicott City, MD (US); Terry E. Phillips, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 435 days.

(21) Appl. No.: 13/419,809

(22) Filed: Mar. 14, 2012

(65) Prior Publication Data

US 2012/0236901 A1 Sep. 20, 2012

Related U.S. Application Data

(60) Provisional application No. 61/452,239, filed on Mar. 14, 2011.

(51) Int. Cl.
*G01K 3/04* (2006.01)
*G01K 13/00* (2006.01)

(52) U.S. Cl.
CPC .................................... *G01K 3/04* (2013.01)
USPC ........................... 374/102; 116/216; 374/208

(58) Field of Classification Search
USPC .......... 374/100–106, 141, 143, 208; 116/216
See application file for complete search history.

(56) References Cited

U.S. PATENT DOCUMENTS

| | | | | |
|---|---|---|---|---|
| 3,242,733 A * | 3/1966 | Johnson | ........................ | 374/102 |
| 3,620,677 A * | 11/1971 | Morison | ....................... | 422/423 |
| 3,739,642 A * | 6/1973 | Klingler | ........................ | 374/193 |
| 4,042,336 A * | 8/1977 | Larsson | ........................ | 422/409 |
| 4,057,029 A * | 11/1977 | Seiter | ............................ | 374/106 |
| 4,116,065 A * | 9/1978 | Jensen | .......................... | 374/194 |
| 4,170,138 A * | 10/1979 | Wiebe | ........................... | 374/193 |
| 4,408,557 A * | 10/1983 | Bradley et al. | ................ | 116/206 |
| 4,432,656 A * | 2/1984 | Allmendinger | ................ | 374/102 |
| 4,533,640 A * | 8/1985 | Shafer | ................................ | 436/2 |
| 4,647,224 A * | 3/1987 | Holm et al. | .................... | 374/162 |
| 4,844,622 A | 7/1989 | Weiss | | |
| 4,968,153 A * | 11/1990 | Stachoviak | ................... | 374/189 |
| 5,662,419 A | 9/1997 | Lamagna | | |
| 6,741,523 B1 * | 5/2004 | Bommarito et al. | .......... | 368/327 |
| 6,916,116 B2 | 7/2005 | Dickmann et al. | | |
| 7,011,445 B1 * | 3/2006 | Hamilton et al. | ............. | 374/201 |
| 7,429,126 B2 | 9/2008 | Maschietti et al. | | |
| 8,172,458 B2 * | 5/2012 | Petrakis | ........................ | 374/101 |
| 8,671,871 B2 * | 3/2014 | Huffman et al. | ............... | 116/216 |
| 2003/0214997 A1 * | 11/2003 | Diekmann et al. | ............. | 374/102 |
| 2008/0084912 A1 * | 4/2008 | Maschietti et al. | ........... | 374/102 |
| 2008/0232426 A1 * | 9/2008 | Welt | .............................. | 374/102 |
| 2011/0017123 A1 | 1/2011 | Maschietti et al. | | |
| 2012/0236900 A1 * | 9/2012 | Hubbard et al. | .............. | 374/102 |

OTHER PUBLICATIONS

K. J. Kubiak, et al.; Dynamics of Contact Line Motion during the Wetting of rough Surfaces and Correlation With Topographical surface Parameters; Wiley Periodicals, Inc., Scanning vol. 33, 370-377 (2011).

\* cited by examiner

*Primary Examiner* — Gail Kaplan Verbitsky
(74) *Attorney, Agent, or Firm* — Noah J. Hayward

(57) ABSTRACT

A time-temperature indication device includes a first reservoir having a fluid disposed therein, and a capillary tube. The capillary tube is disposed proximate to the first reservoir to receive fluid from the first reservoir responsive to changes in viscosity of the fluid based on changes in temperature. The capillary tube restricts flow of the fluid out of the first reservoir into the capillary tube to enable fluid flow only in a single direction.

19 Claims, 10 Drawing Sheets

TIME-TEMPERATURE INDICATOR

CROSS-REFERENCE TO RELATED APPLICATIONS

This application claims the benefit of U.S. Provisional Application No. 61/452,239 filed on Mar. 14, 2011, the entire contents of which are hereby incorporated herein by reference.

BACKGROUND OF THE INVENTION

1. Field of the Invention

Example embodiments generally relate to time-temperature indicator devices and, more particularly, relate to a long-life and unpowered, time-temperature indicator.

2. Description of the Related Art

Many perishable products have a limited lifetime that can be at least in part dependent upon the temperatures to which the products are exposed. Moreover, in some cases, the length time of such exposure may further impact the rate of degradation of the product. For example, some foods and pharmaceuticals may have a nominal expiration date at a certain temperature, but may expire more quickly if they are exposed to other temperatures for at least a given time period.

Since products are often shipped and may change hands and experience different conditions during their shipment process, it cannot be assumed that a product that was shipped at a particular temperature, and arrives at the same temperature, has been maintained at that temperature throughout the shipping process. Moreover, the simple fact that a temperature fluctuation was encountered, even a fluctuation above a certain amount, may not necessarily mean that the product is compromised. Thus, an indication that a certain temperature was reached [for which there are existing commercial devices], without a corresponding indication of the amount of time that the exposure to that temperature lasted may lead to unnecessary destruction of products.

To address the issues described above, time-temperature indicators of various types have been developed. However, many such time-temperature indicators rely on powered monitoring devices, chemical reactions or diffusion of controlled dyes. However, properties of the chemicals or dyes may change over time, and the power is only available for a limited time. Thus, the life time of such devices may be limited, and such devices may not be very robust.

SUMMARY OF THE INVENTION

Accordingly, some example embodiments include a rugged and non-powered time-temperature indicator device. Moreover, some example embodiments are orientation independent.

In one example embodiment, a time-temperature indication device is provided. The time-temperature indication device may include a first reservoir having a fluid disposed therein, and at least one capillary tube. The at least one capillary tube may be disposed proximate to the first reservoir to receive fluid from the first reservoir responsive to changes in viscosity of the fluid based on changes in temperature. The at least one capillary tube may restrict flow of the fluid out of the first reservoir into the capillary tube to enable fluid flow only in a single direction.

BRIEF DESCRIPTION OF THE DRAWINGS

Figure 1A:
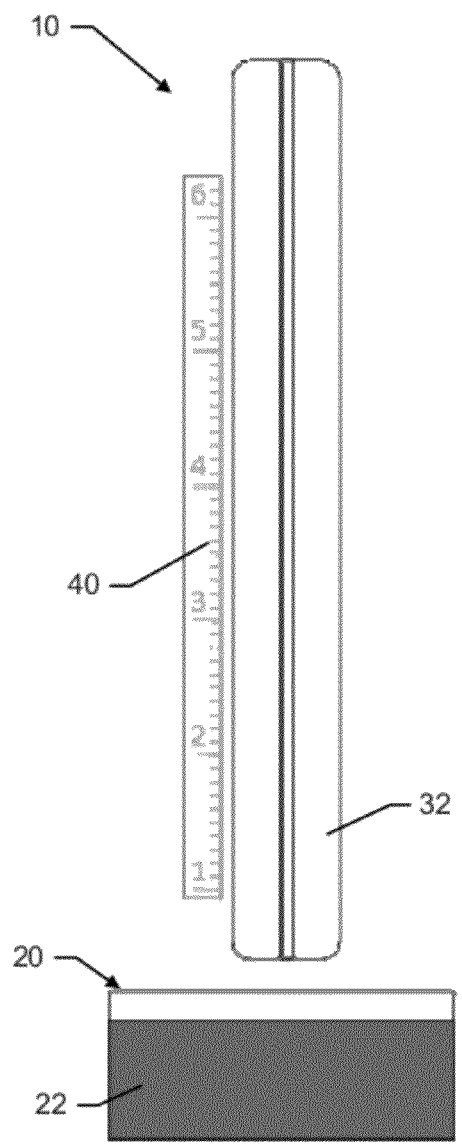
Figure 1B:
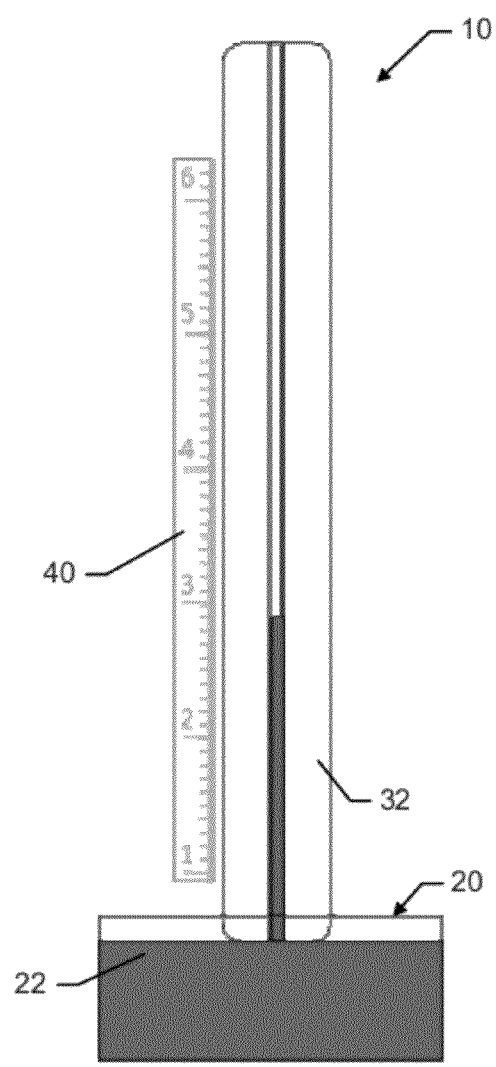
Figure 2:
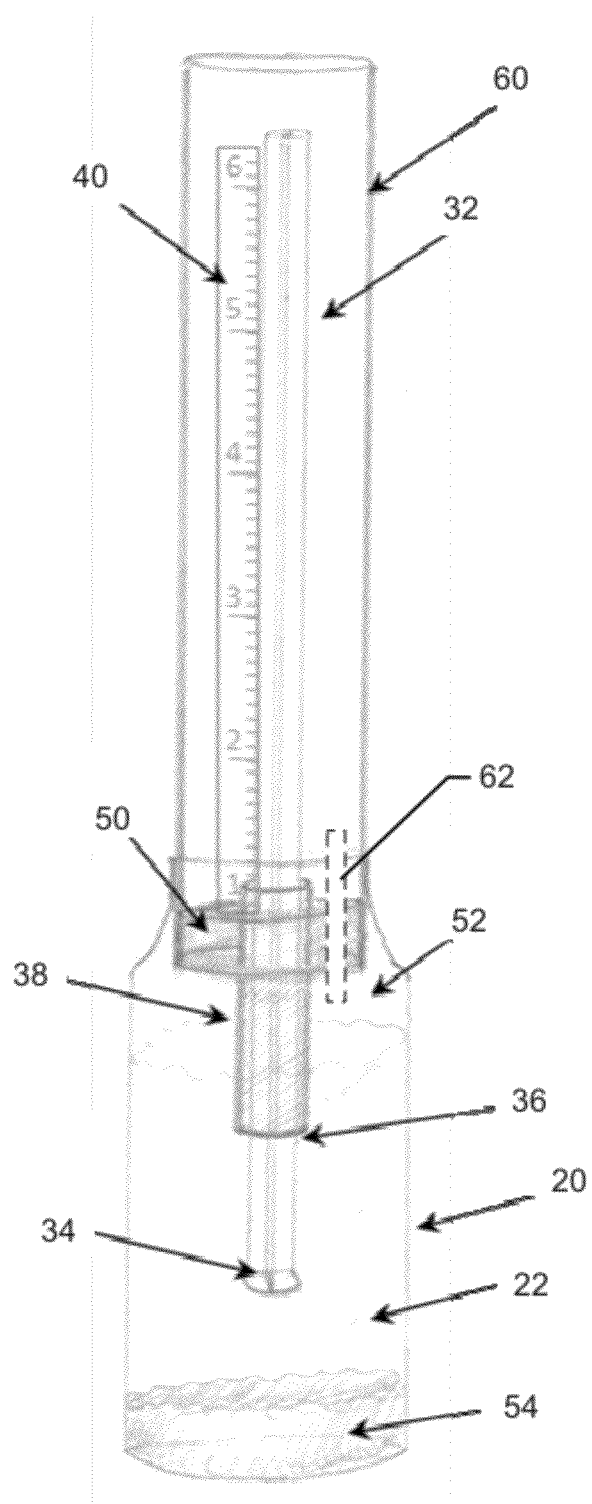
Figure 3:
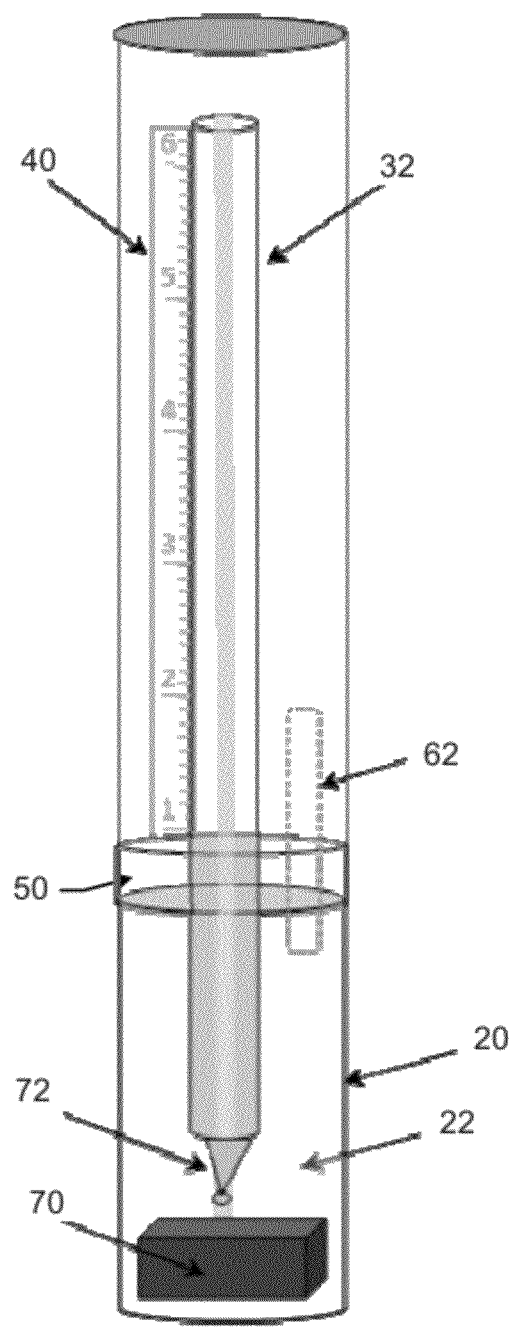
Figure 4:
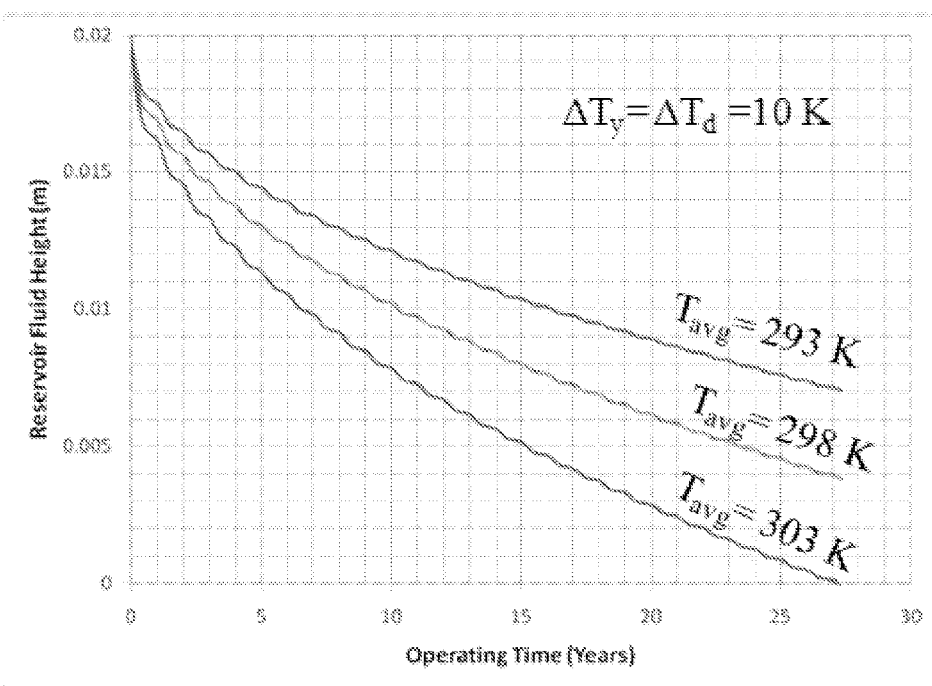
Figure 5:
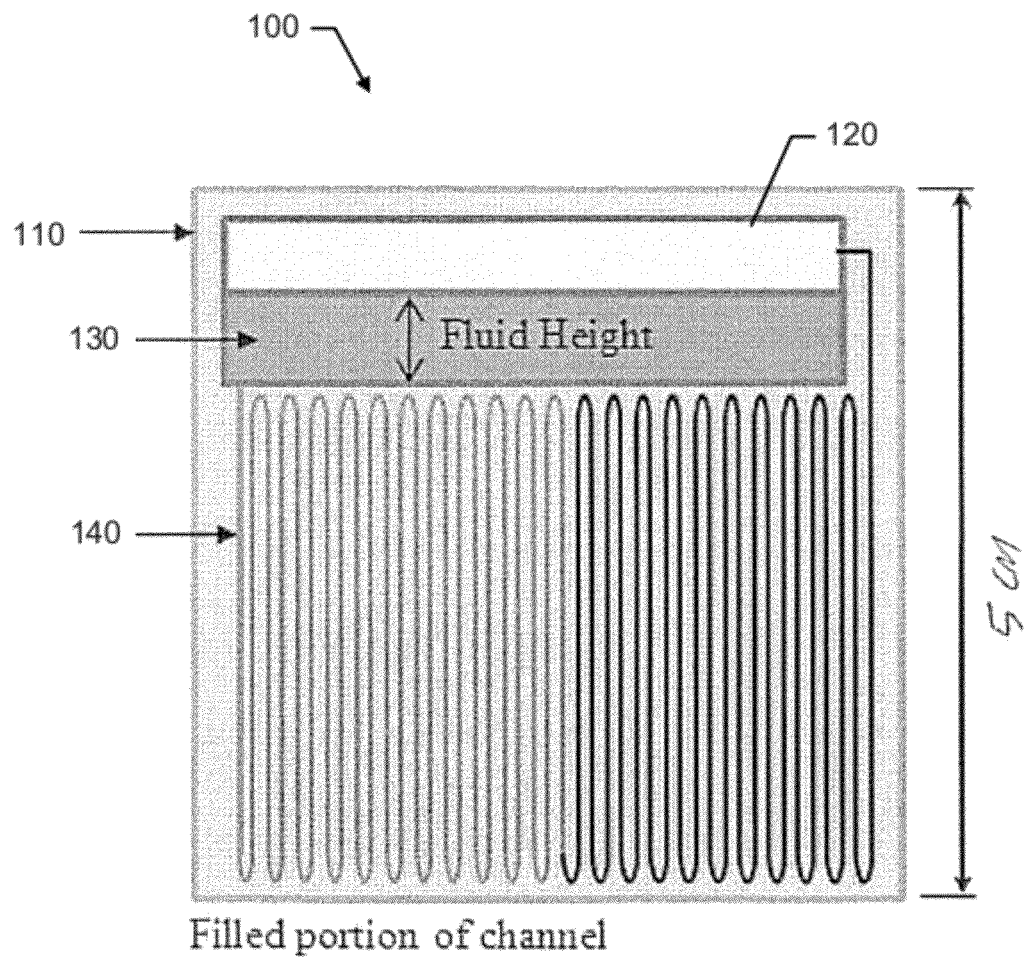
Figure 6:
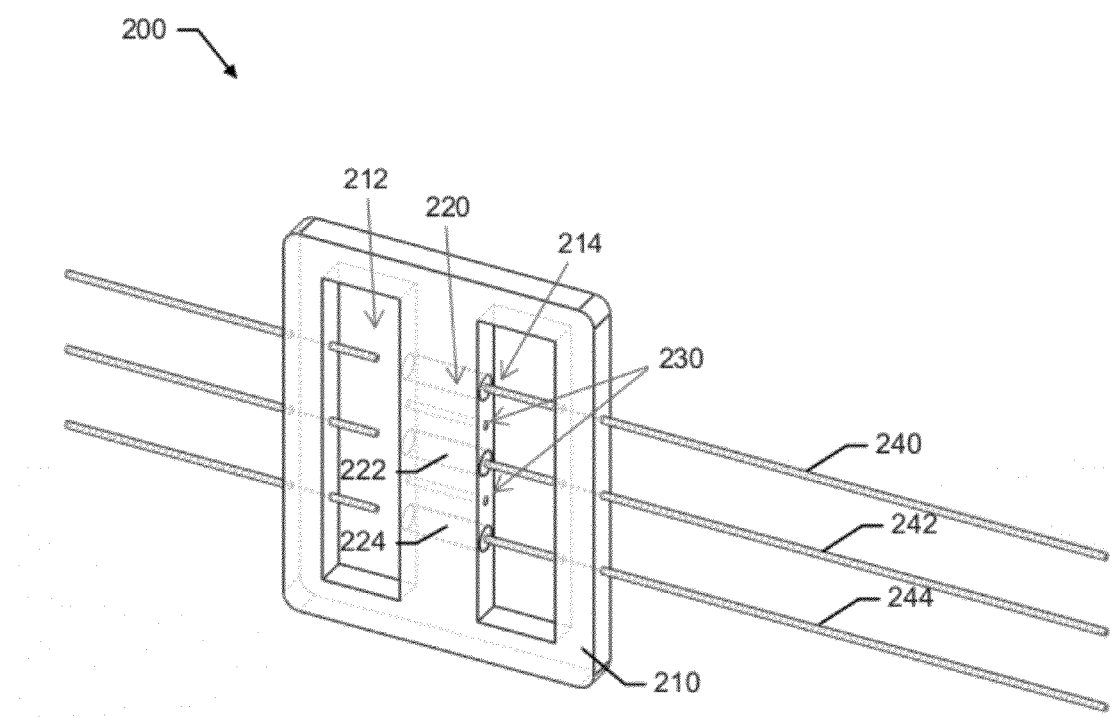
Figure 7:
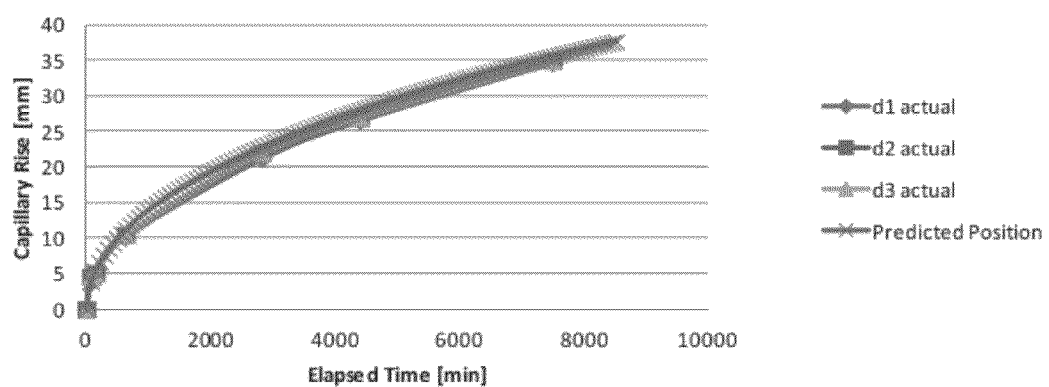
Figure 8:
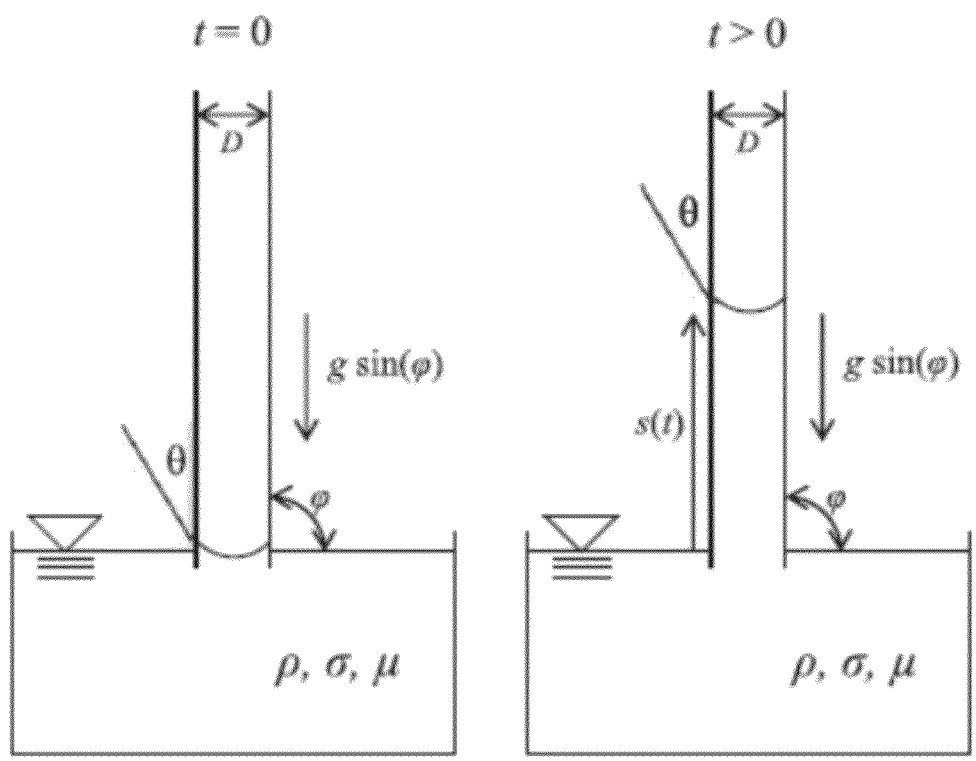
Figure 9:
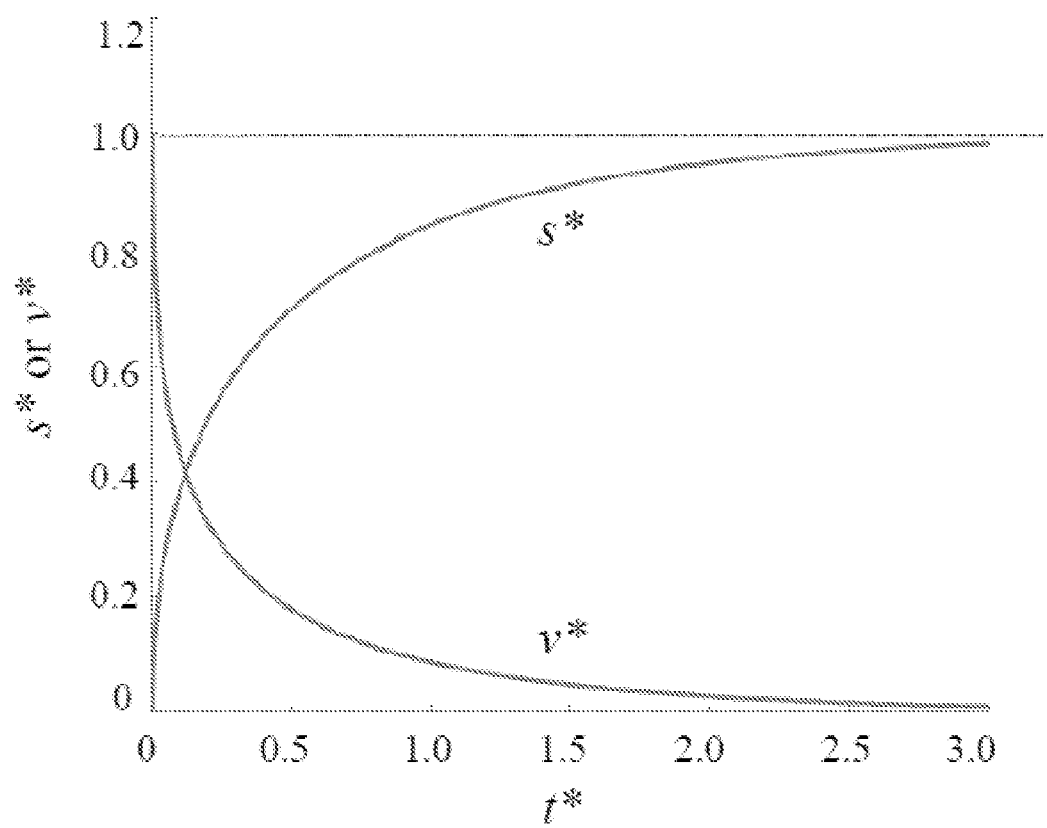
Figure 10:
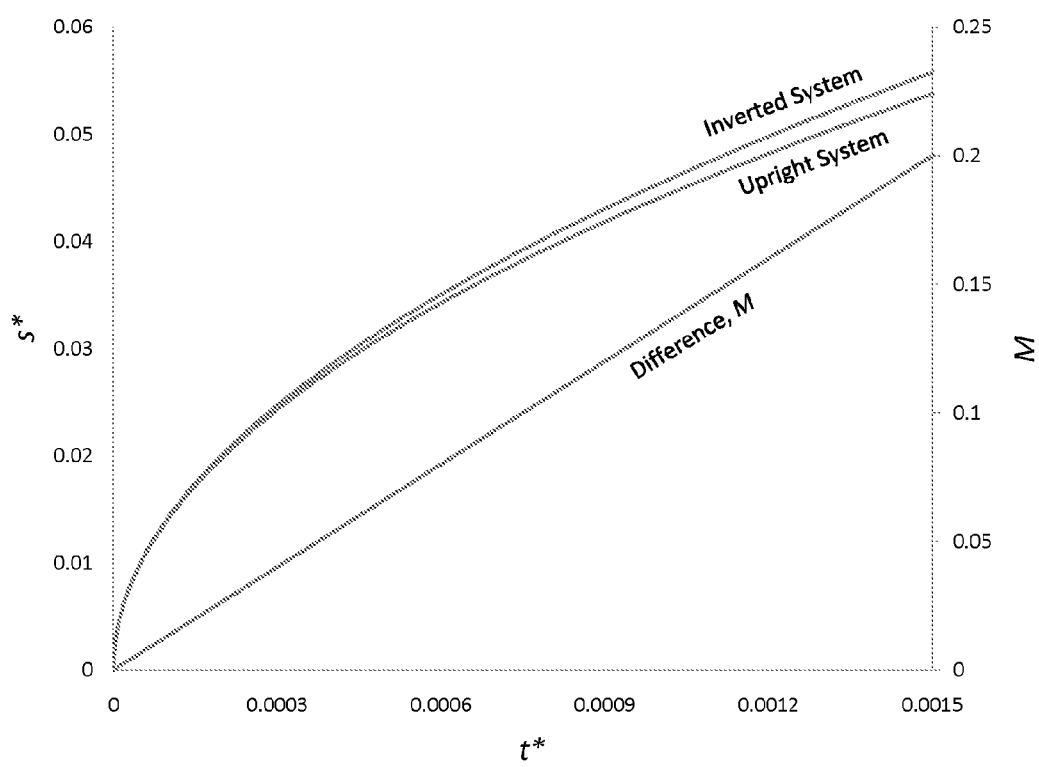

Having thus described several example embodiments the invention in general terms, reference will now be made to the accompanying drawings, which are not necessarily drawn to scale, and wherein:

FIG. 1, which includes FIGS. 1A and 1B, illustrates a side view of a time-temperature indication device according to an example embodiment;

FIG. 2 illustrates an example embodiment in which a capillary tube is partially submerged in fluid according to an example embodiment;

FIG. 3 illustrates an alternative example embodiment in which magnetic influence is used to expose a capillary tube to fluid according to an example embodiment;

FIG. 4 illustrates a variation in fluid height with operative time according to an example embodiment;

FIG. 5 illustrates a possible alternative implementation in which a time-temperature indication device is provided in a glass substrate having a reservoir according to an example embodiment;

FIG. 6 illustrates an example of a time-temperature indication device that employs an orientation independent design along with multiple capillary tubes according to an example embodiment;

FIG. 7 illustrates test data showing modeled versus actual fluid motion within the device of FIG. 6 according to an example embodiment;

FIG. 8 illustrates an example of advancement of a fluid front according to an example embodiment;

FIG. 9 illustrates a graph of variation in capillary height and velocity with time according to an example embodiment; and FIG. 10 illustrates a graph of variations in height with time for inverted and upright capillaries according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may improve the ability of a time-temperature indicator to provide accurate indications relating to temperature exposure, and the time spent exposed to such temperatures over an extended period of time. In this regard, some example embodiments may not rely on external power, and may remain useful over very long period of time (e.g., years or even decades).

FIG. 1, which includes FIGS. 1A and 1B, illustrates a side view of a time-temperature indication device 10 according to an example embodiment. As shown in FIG. 1, the time-temperature indication device 10 may include a reservoir 20, which may have a fluid 22 disposed therein. The fluid 22 may be a material having a relatively high viscosity and known thermal properties such that the change in viscosity of the fluid 22 responsive to temperature changes may be predictable. The time-temperature indication device 10 may further include a capillary tube 32. The capillary tube 32 may be relatively small (e.g., less than about 50 µm, or in some cases even less than about 20 µm)

The capillary tube 32 may be sized such that it is well matched to the physical properties of the fluid 22, particularly the surface tension, contact angle and non-linear response of viscosity to temperature. It is the large sensitivity of viscosity to temperature that allows the capillary force, which is relatively constant over a wide temperature range, to be counteracted by the resistance to flow in the small capillary provided by the fluid viscosity. As the temperature is raised, the viscosity will decrease, promoting a larger force imbalance at the liquid-gas interface, and subsequently an increase in the velocity of the advancing liquid front. By decreasing the viscosity through temperature, at least for the period of time that the fluid 22 is at a temperature above the threshold, the fluid 22 may advance up the capillary tube 32. The properties of the fluid 22 in connection with the size of the capillary tube 32 may provide for movement within the capillary tube 32 only in a single direction (i.e., upward in this example). As such, as a contact line where the fluid 22 contacts the internal walls of the capillary tube 32 advances, the contact line will always at least hold its current position if temperature drops below the threshold, but will continue to advance if the temperature exceeds the threshold again for any length of time. In other words, advancement of the contact line is permanent.

An advancement of the fluid 22 up the capillary tube 32 therefore necessarily indicates that a threshold temperature has been exceeded. However, the amount of advancement up the capillary tube 32 may further indicate a value indicative of the amount of the time the threshold temperature was exceeded. Accordingly, for example, with known properties of the capillary tube 32 and the fluid 22, it may be possible to develop a scale 40 to provide visible indications regarding the time that the threshold temperature was exceeded.

In some cases, it may be useful to keep the fluid 22 separated from the capillary tube 32 until monitoring is desired. For example, when the product is shipped or stored, it may be desirable to initiate monitoring. In some cases, manual special separation of the fluid 22 and the capillary tube 32 may be employed. In this regard, FIG. 1A shows the capillary tube 32 being maintained a distance away from the fluid 22, while FIG. 1B shows the capillary tube 32 being placed in contact with the fluid 22. Of note, the capillary tube 32 is not placed into, or submerged within the fluid 22. Instead, the capillary tube 32 is placed in contact with a surface of the fluid 22.

In some embodiments, rather than physically moving the capillary tube 32 or the reservoir 20 to initiate contact between the fluid 22 and the capillary tube 32, an inhibitor may be removably placed in between the fluid 22 and the capillary tube 32. Moreover, rather than placing the capillary tube 32 so that it contacts a surface of the fluid 22, it may be possible to at least partially submerge a portion of the capillary tube 32 within the fluid 22. When monitoring is desired, the inhibitor may be functionally removed. For example, the inhibitor may be cracked or broken to allow the fluid 22 to pass therethrough. Alternatively, the inhibitor may be withdrawn from its location blocking access of the fluid 22 to the capillary tube 32 via magnetic influence, or magnetic influence may be used to move an object that operates to crack or break the inhibitor to allow the fluid 22 to have access to the capillary tube 32.

FIG. 2 illustrates an example embodiment in which the capillary tube 32 is partially submerged in the fluid 22. In this example, the reservoir 20 may be flexible to allow a user to deform the reservoir 20 to the point where the capillary tube 32, which may include a sealed end 34, may be broken at a break point 36 below a rigid support 38. The rigid support 38 may be held in place by an epoxy seal 50, and the reservoir 20 may have an air head space 52 disposed between the fluid 22 and the epoxy seal 50. In some embodiments, the capillary tube 32 and scale 40 may be further provided within a protective support tube 60. The reservoir 20 may also include another epoxy seal 54 disposed at a bottom portion thereof. In some embodiments, the protective tube 60 may be open at the top. However, in alternative embodiments, the protective tube 60 may be closed at the top and a pressure equalizing tube 62 (shown in dashed lines to illustrate the optional nature of this component in this example embodiment) may be provided between the air head space 52 and the protective support tube 60.

FIG. 3 illustrates an alternative example embodiment in which magnetic influence is used to expose the capillary tube 32 to the fluid 22. In this regard, a magnet 70 is provided to be influenced into contact with a breakaway tip 72 to cause the breakaway tip 72 to be functionally removed and expose the capillary tube 32 to the fluid 22.

The time-temperature indication device 10 is a fluid mechanical device in which surface and body forces push the fluid 22 from the reservoir 20 through the capillary tube 32. The flow rate through the capillary tube 32 is related to a) the magnitude and direction of the applied forces, b) the thermophysical properties of the fluid 22, and c) the geometries of the capillary tube 32 and the reservoir 20. Variations in local temperature will change the thermophysical properties of the fluid 22 and as a result of the changes in viscosity of the fluid 22 due to temperature change that occurs based on those properties and the geometries of the capillary tube 32 and the reservoir 20, the liquid flow rate through the capillary tube 32 will be impacted. Mass conservation generally requires that the difference between the instantaneous mass of fluid remaining in the reservoir 20 and the initial mass of fluid in the reservoir 20 remain equal to the mass of fluid 22 that has passed through the capillary tube 32. Thus, by controlling the magnitude and direction of the applied forces and by understanding the temperature-sensitivity of the system geometry and fluid 22, the integrated effects of time and temperature history over the operating lifetime of the time-temperature indication device may be extracted based on the instantaneous fluid level.

The combination of gravity and surface tension may force the fluid 22 out of the reservoir 20 and into the capillary tube 32. Temperature variations may alter the viscosity and surface tension of the fluid 22 to thereby change the instantaneous flow rate of the fluid 22 up the capillary tube 32. A variation in fluid height with operative time is shown in FIG. 4 according to one example. The mean temperature of each run is provided and it can be appreciated that daily and annual temperature variations for each run tend to follow a sinusoidal pattern with, in this example, an amplitude of 10 degrees Kelvin. By properly tuning the applied forces, system geometry and the fluid, the lifetime and sensitivity of the time-temperature indication device 10 may be selectively designed.

In some embodiments, rather than employing a linearly extending capillary tube 32, a bent channel may be employed. FIG. 5 illustrates a possible alternative implementation in which a time-temperature indication device 100 is provided in a glass substrate 110 having a reservoir 120 therein. A fluid 130 is provided to wick through a coiled rectangular 30 μm microchannel forming the capillary tube 140. In some cases, the bent channel forming the capillary tube 140 may be as long as 25 m. However, the length may be selected based on the desired operating life and other geometric design considerations. As the fluid 130 wicks into the capillary tube 140, the filled portion of the channel may provide a time-temperature indication.

In an example embodiment, it may be desirable to incorporate design features that may render the device independent of orientation. Moreover, in some embodiments, multiple capillary tubes, each of which may have different or the same characteristics may be employed. FIG. 6 illustrates an example of a time-temperature indication device 200 that employs an orientation independent design along with multiple capillary tubes.

As shown in FIG. 6, the time-temperature indication device 200 may include a substrate 210 having two air cavities (e.g., a first air cavity 212 and a second air cavity 214) disposed therein. The substrate 210 may include at least one reservoir formed therein. In this example, a first reservoir 220, a second reservoir 222 and a third reservoir 224 are each disposed in the substrate 210 to extend between the first and second air cavities 212 and 214. In some embodiments, one or more equalization tubes 230 may be provided to equalize pressure between the first and second air cavities 212 and 214. The substrate 210 may be covered at its front and its back (e.g., by being laminated or otherwise coated to seal the device) so that the pressure in the air cavities is fixed. In an example embodiment, a capillary tube having a corresponding small capillary tube may be disposed proximate to each reservoir to extend away from the corresponding reservoir through one of the air cavities and into the other air cavity. Accordingly, a first capillary tube 240 may be provided in contact with the first reservoir 220, a second capillary tube 242 may be provided in contact with the second reservoir 222, and a third capillary tube 244 may be provided in contact with the third reservoir 224. In an example embodiment, the first, second, and third capillary tubes 240, 242 and 244 may each be conically polished proximate to their respective ends that are in contact with the fluid in order to facilitate wetting of the capillary tubes therein to allow high viscosity fluid to begin wicking up the very small capillary tube (e.g., about 20 μm diameter).

A working fluid may be disposed in each of the first reservoir 220, the second reservoir 222 and the third reservoir 224. In some cases, the working fluid in each reservoir may be the same. However, in other cases, a different fluid may be provided in at least one or in each of the reservoirs. Similarly, in some cases, each capillary tube may be the same. However, in other cases, a different sized capillary tube may be provided in at least one or in each of the capillary tubes. The fact that each reservoir is open at its respective longitudinal ends to the air cavities, which have balanced pressures therein, may minimize any air-spring effect in the capillary tubes that would otherwise occur if the capillary tubes were closed at one end. As a numerical example of the air-spring effect that could otherwise occur, consider a capillary tube with a diameter of 127 μm and a fluid having a final rise height of 110 mm when the top end of the capillary tube is open. When the top end is closed instead, the fluid would only be allowed to progress about 10 mm before the capillary tube pressure is equal to the headspace pressure and motion would be stopped.

In some embodiments, to vacuum prime the capillary tube, each reservoir may first be filled. The capillary tubes may then be inserted so as to just touch or contact the fluid in the corresponding reservoir. Vacuum may then be pulled (but not to cause significant vaporization) while simultaneously heating the fluid. Once the fluid has been primed to a fixed location, the device may be quenched to stop fluid motion. In some cases, it may be desirable to prime the system to a point that the fluid has wet the interior of the capillary tube and formed a meniscus with a contact angle well established to achieve greater repeatability and accuracy due to reduction of unknown entrance effects leading up to the time when governing equations of motion are valid.

In an example embodiment, the reservoirs may be structured to be large enough to hold the fluid inside under all device orientations via a contact line "pinning" mechanism and to minimize the capillary tube pressure induced from the geometry by overfilling the fluid. To achieve near 100% volumetric filling of the reservoirs, the fluid may be frozen and cut. An initial contact angle at ends of the wells may then be much greater than the free surface contact angle for most every fluid approaching 90 degrees. When the contact angle approaches 90 degrees, the fluid is said to be pinned in the reservoir because the capillary tube pressure goes to zero. This design feature allows for minimizing the capillary pressure to at least one to two orders of magnitude below the capillary pressure driving the fluid movement for the indicator. The combination of pinning and priming may prevent the fluid from falling out of the reservoirs even when the reservoirs are vertically oriented for prolonged times and at elevated temperatures (e.g., greater than about 175 degrees F.). In an example embodiment, the fluid may be H-18000 polybutene oil. However, other fluids may be employed in other embodiments. FIG. 7 illustrates test data showing modeled versus actual fluid motion within the device of FIG. 6.

Motion in the capillary tube will be further described in reference to FIG. 8, which shows a position, s, of a fluid front at time, t, advancing though a circular capillary having an inner diameter, D. The angle of the capillary with respect to the fluid surface is defined as Ø. Variables ρ and μ represent the density and viscosity of the fluid, and σ and θ, represent the surface tension and contact angle of the fluid/solid/air interface.

From Newton's second law, the acceleration $\alpha_f$ of the liquid front advancing through a capillary is proportional to the sum of the capillary force $F_c$, the hydrostatic force $F_g$, the viscous drag force $F_v$, and the inlet drag force, $F_I$:

$$\rho \alpha_f = F_c - F_g - F_v - F_I, \quad (1)$$

where negative signs identify forces that act in the opposite direction of fluid flow. The capillary force, as calculated from the Young-Laplace equation is:

$$F_c = \pi D \sigma \cos \theta. \quad (2)$$

while the hydrostatic force, which arises from differences in hydrostatic pressure, is:

$$F_g = \frac{\pi D^2}{4} \rho s (g \sin \phi), \quad (3)$$

where g is the magnitude of the gravitational acceleration. For creeping (low Reynolds number) flows, the viscous drag force between any two points is related to the channel geometry, the fluid slug length s, and the corresponding pressure difference, ΔP, such that:

$$F_v = \left(\frac{\pi D^2 s}{4}\right)\left(\frac{\Delta P}{s}\right). \quad (4)$$

Using the Poiseuille relation, the pressure gradient (ΔP/s) can be related to the flow viscosity through the fluid viscosity and capillary radius:

$$\frac{ds}{dt} = \frac{D^2}{32\mu}\left(\frac{\Delta P}{s}\right), \quad (5)$$

such that $$F_v = 8\pi\mu s \frac{ds}{dt}. \quad (6)$$

Finally, the acceleration of the fluid particle is:

$$\rho a_f = \rho \frac{\pi D^2}{4} s \frac{d^2 s}{dt^2}. \quad (7)$$

Combining equations (1) to (7) gives the governing equation of fluid motion that, after simplification becomes:

$$\rho \frac{d(s\dot{s})}{dt} = \frac{4\sigma\cos\theta}{D} - \frac{32\mu}{D^2} s\dot{s} - \rho(g\sin\phi)s, \quad (8)$$

where $\dot{s}$ denotes the time derivative of s. Note that the effects of inertial losses at the tube inlet have been ignored, an assumption that may be justified for low-Reynolds number capillary systems.

To assess the role (and relative importance of each force in equation (8), nondimensionalization may be performed using viscosity and gravity as scaling factors. The surface tension term may be isolated such that equation (8) may be rewritten as:

$$\left[\frac{\rho D}{4\sigma\cos\theta}\right]\frac{d(s\dot{s})}{dt} + \left[\frac{8\mu}{D\sigma\cos\theta}\right]s\dot{s} + \left[\frac{\rho(g\sin\phi)D}{4\sigma\cos\theta}\right]s = 1, \quad (9)$$

or, as $$a\frac{d(s\dot{s})}{dt} + bs\dot{s} + cs = 1, \quad (10)$$

where $|a|=s^2/m^2$, $[b]=s/m^2$ and $[c]=1/m$. Given these five variables (a, b, c, s, t) and two fundamental units (time and length), three dimensionless groups may be expected:

$$s^* = \left(\frac{\rho(g\sin\phi)D}{4(\sigma\cos\theta)}\right)s, \quad (11)$$

$$t^* = \left(\frac{\rho^2(g\sin\phi)^2 D^3}{128\mu(\sigma\cos\theta)}\right)t, \quad (12)$$

and $$\Omega = \sqrt{\frac{4096(\sigma\cos\theta)\mu^2}{\rho^3(g\sin\phi)^2 D^5}}. \quad (13)$$

From these groups, $$s^* \equiv \left(\frac{1}{s_m}\right)s, \quad (14)$$

and $$t^* \equiv \left(\frac{1}{t_m}\right)t, \quad (15)$$

may be defined where $s_m$ is the static equilibrium position of the fluid front and $t_m$ is a time scale characterizing the time required to reach this position. Using the nondimensional variables, equation (8) can be rewritten as:

$$\frac{1}{\Omega^2}\frac{d\left(s^*\frac{ds^*}{dt^*}\right)}{dt^*} + s^*\frac{ds^*}{dt^*} + s^* = 1. \quad (16)$$

In this form, the nondimensional position s* represents a ratio of surface tension to gravity while the nondimensionalized time t* represents a ratio of gravity to viscosity and surface tension. The $\Omega$ group represents a ratio of surface tension and viscosity to gravity and, describes the influence of fluid inertia on the dynamics of the interface. If $\Omega \gg 1$ (the Washburn limit), a condition realized by high viscosity oils inside small diameter capillaries, the first term in equation (16) becomes negligible compared to the remaining terms and the equation of motion simplifies to:

$$s^*\frac{ds^*}{dt^*} + s^* = 1 (\text{for } s^* > 0). \quad (17)$$

If the system remains at a single temperature, is initially empty, and the fluid is initially at rest, equation (17) has the exact solution:

$$s^* = 1 + W\left[\frac{-1}{\exp(1+t^*)}\right], \quad (18)$$

where W(z) denotes the Lambert W function.

FIG. 10 plots variation in s* with t* as predicted from equation (18). When fluid enters the capillary, the magnitude of the surface tension force pulling the fluid up the tube is large compared to the hydrostatic force pulling in the direction of gravity. As fluid advances further into the capillary, however, the hydrostatic force pulling down the tube and the quantity of fluid inside the capillary both increase. The decrease in net force with penetration distance, combined with this increase in mass, cause the acceleration and velocity of the fluid slug to decrease monotonically with increasing t* and eventually approach zero. In order for a monitoring device to remain functional, as discussed below, the maximum height reached by the fluid at the end of the monitoring period must remain below the static equilibrium position.

From equation (18), the maximum penetration distance into the capillary, $s^*_m$, is defined by:

$$\lim_{t\to\infty} s^* = s^*_m = 1, \quad (19)$$

such that $$s_m = \frac{4\sigma\cos\theta}{\rho g(\sin\phi)D}. \quad (20)$$

This result, as mentioned above, is identical to that obtained from a static force balance, and indicates that fluids with higher surface tensions, smaller contact angles, and/or lower densities may have higher equilibrium positions than those fluids that have the opposite properties. Within the context of the nondimensionalized position defined in equation (14), however, all systems rise from zero to a final position of unity.

The nondimensional velocity of the fluid front, $v^*$, is evaluated by taking the derivative of equation (18) with respect to time:

$$\frac{ds^*}{dt^*} = v^* = -\frac{W\left[\frac{-1}{\exp(1+t^*)}\right]}{1 + W\left[\frac{-1}{\exp(1+t^*)}\right]}, \quad (21)$$

where $v^*$ is defined by the expression:

$$v^* = \frac{32\mu}{\rho g(\sin\phi)D^2} v = \left(\frac{1}{v_m}\right)v. \quad (22)$$

The velocity scale factor $v_m$ represents the initial imbibitions velocity of the liquid along the capillary tube (when inertial effects are negligible). As suggested by equation (22), this scale factor tends to decrease with increasing viscosity, such that fluids with lower viscosities tend to rise faster than those with higher viscosities. This relationship between fluid velocity and fluid viscosity, along with the absence of any relationship between $s_m$ and viscosity, may be important considerations with respect to the operation and design of a surface tension-driven time-temperature indicator.

In practice, the correlation between aging an temperature may be modeled using the Arrhenius equation, which predicts that the decay reaction rate tends to increase with increasing temperature:

$$k(T) = A\exp^{-E_a/R_u T}, \quad (23)$$

where k is the temperature-dependent reaction rate, A is a constant exponential pre-factor, $E_a$ is the activation energy, $R_u$ is the universal gas constant and T is the absolute temperature. Note that equation (23) is typically plotted as the function:

$$\ln\left(\frac{k(T)}{A}\right) = -\frac{R_a}{R_u T}, \quad (24)$$

where $E_a/R_u$ is the slope line that maps $$\ln\left(\frac{k(T)}{A}\right) \text{ to } \frac{1}{T}.$$

For a surface tension-driven aging indicator to match this behavior, temperature-related changes in velocity of the fluid front must exhibit the same sensitivity to temperature as the aging reaction. For example, if the product reaction rate increases by a factor of two with each 10 K increase in temperature, this temperature increase may reduce the time required for the fluid to advance to a specified end-of-life point in the capillary by a factor of two.

To understand the effects of temperature changes on the motion of the fluid front, consider the derivatives of $s_m$ and $v_s$ with respect to temperature:

$$\frac{ds_m}{dT} = \frac{d}{dT}\left(\frac{4\sigma\cos\theta}{\rho g\sin\phi D}\right) \quad (25)$$

$$= s_m\left[\frac{1}{\sigma}\frac{d\sigma}{dT} - \frac{1}{\rho}\frac{d\rho}{dT} - \tan\theta\frac{d\theta}{dT} - \frac{1}{D}\frac{dD}{dT}\right]$$

and $$\frac{dv_m}{dT} = \frac{d}{dT}\left(\frac{\rho(g\sin\phi)D^2}{32\mu}\right) \quad (26)$$

$$= v_m\left[-\frac{1}{\mu}\frac{d\mu}{dT} + \frac{1}{\rho}\frac{d\rho}{dT} + 2\left(\frac{1}{D}\frac{dD}{dT}\right)\right].$$

For fluids below the critical point, the variation in density and surface tension with temperature can be modeled as:

$$\frac{\rho}{\rho_0} = 1 - \alpha_1(T - T_0), \quad (27)$$

and $$\frac{\sigma}{\sigma_0} = 1 - \kappa(T - T_0), \quad (28)$$

where $\rho_o$ and $\sigma_o$ represent the density and surface tension at a reference temperature $T_0$, $\alpha_1$ is the thermal expansion coefficient of the liquid and K is a surface tension temperature sensitivity coefficient. Similarly, from the definition of the thermal expansion coefficient, the variation in tube diameter with temperature is:

$$\frac{D}{D_0} = 1 + \alpha_s(T - T_0), \quad (29)$$

where $\alpha_s$ is the thermal expansion coefficient of the glass.

Substituting Eqs. (27)-(29) into Eq. (25) gives, $$\frac{ds_m}{dT} = s_m[(\alpha_1 - \kappa) - \alpha_s]. \quad (30)$$

Consider the magnitude of each term in the expression. The thermal expansion coefficient of glass, although dependent on the type and composition, is $\theta(10^{-6})$ K$^{-1}$. For hydrocarbon-based oils at and around room temperature, $\alpha_1$ and $\kappa$ are both on the order of $\theta(10^{-4})$ and for many oils, are equivalent. That is, any temperature-related changes in the position of the fluid front due to fluid thermal expansion is offset by a commensurate (and opposite) change in the surface tension of the fluid. With these values, equation (30) becomes:

$$\frac{ds_m}{dT} \approx s_m[(\theta(10^{-4}) - \theta(10^{-4})) + \theta(10^{-6})]K^{-1} < s_m[\theta(10^{-4})]K^{-1}. \quad (31)$$

This comparison suggests that, over the exposure ranges relevant to this work, changes in $s_m$ due to changes in temperature may be negligible.

Now consider equation (26), which, using equations (27) and (29), can be written as:

$$\frac{dv_s}{dT} = v_s\left[-\frac{1}{\mu}\frac{d\mu}{dT} + \alpha_1 + 2\alpha_s\right]. \quad (32)$$

For most fluids, the variation in viscosity with temperature can be modeled as:

$$\frac{\mu}{\mu_o} = \exp\left[\gamma\left(\frac{T_0}{T} - 1\right)\right]. \quad (33)$$

where $\mu_o$ represents the viscosity at $T_0$ and $\gamma$ represents the fluid viscosity parameter. Substituting Eq. (33) into Eq. (32) gives:

$$\frac{dv_s}{dT} \approx v_s\left[-\frac{\gamma T_0}{T^2}\exp\left[\gamma\left(\frac{T_o}{T} - 1\right)\right] + \alpha_1 + 2\alpha_s\right]. \quad (34)$$

For most high-viscosity oils, γ ranges from 10 to 30. Thus, for temperature exposures relevant to this work, the quantities within equation (34) become:

$$\frac{dv_s}{dT} = v_s[o(10^{-1}) - o(10^{-4}) + o(10^{-6})]K^{-1} \quad (35)$$

$$\approx v_s[p(10^{-1})]K^{-1},$$

such that $$\frac{dv_s}{dT} \approx v_s\left[-\frac{\gamma T_o}{T^2}\exp\left[\gamma\left(\frac{T_o}{T} - 1\right)\right]\right]. \quad (36)$$

Although exact values of γ, $\alpha_f$ and $\alpha_s$ differ for each fluid, this order-of-magnitude comparison suggests that the sensitivity of $v_s$ to temperature-related changes in fluid density and tube diameter are negligible compared to the sensitivity of $v_s$ to temperature-related changes in the fluid viscosity.

With viscosity driving the overall temperature response of the fluid front, an expression that relates temperature-related changes in the velocity of the fluid front through the capillary to the Arrhenius relationship can be derived. From equation (22), the ratio of the velocity scale factor of a fluid at temperature T to that at temperature $T_o$ is given by:

$$\frac{v_{s,T}}{v_{s,0}} = \left(\frac{\rho_D}{\rho_0}\right)\left(\frac{\mu_0}{\mu_T}\right)\left(\frac{D_D}{D_0}\right)^2. \quad (37)$$

Substituting Eqs. (27), (29), and (33) into Eq. (37):

$$\frac{v_{s,T}}{v_{s,0}} = (1 - \alpha_1[T - T_0])\left(\exp\left[-\gamma\left(\frac{T_o}{T} - 1\right)\right]\right)(1 + \alpha_s[T - T_o])^2. \quad (38)$$

Since, over the temperature range considered here, $\kappa_f(T-T_0)$ and $\kappa_s(T-T_0)$ are both much smaller than one, Eq. (38) can be simplified to:

$$\frac{v_{s,T}}{v_{s,T_0}} = \exp\left[-\gamma\left(\frac{T_0}{T} - 1\right)\right]. \quad (39)$$

Rearranging to isolate the temperature dependence:

$$v_{s,T} = B\exp^{\gamma T_0/T}, \quad (40)$$

or, $$\ln\left(\frac{v_{s,T}}{B}\right) = -\frac{\gamma T_0}{T}, \quad (41)$$

where B is a constant exponential pre-factor.

A comparison of equations (24) and (41) indicates that the temperature response of the fluid motion will match the temperature response of the decay reaction when:

$$\gamma = \frac{E_0}{RT_0}. \quad (42)$$

For example, to follow a generic decay reaction with an activation energy of 70 kJ/mol at 300 K, the oil used in the viscosity parameter must be 28.0 (which is the viscosity parameter of pure glycerine). In terms of designing an aging indicator, this relationship between $E_a$ and γ provides the necessary link between the temperature-sensitivity of fluid motion inside the indicator (through γ) and the temperature-sensitivity of product aging reactions (through $E_a$).

When deriving equation (8), it may be assumed that the fluid front moves in a direction opposite of gravity such that hydrostatic forces always opposed motion of the slug. If the system presented in FIG. 9 is inverted with respect to gravity, such that Ø becomes negative and hydrostatic forces assist with flow through the capillary, equation (8) must be rewritten as:

$$\rho\frac{d(s\dot{s})}{dt} = \frac{4\sigma\cos\theta}{D} - \frac{32\mu}{D^2}s\dot{s} + \rho gs. \quad (43)$$

Using the nondimensionalization procedure presented in Section 2.1, Eq. (43) can be written as:

$$\frac{1}{\Omega^2}\frac{d\left(S^*\frac{ds^*}{dt}\right)}{dt} + s^*\frac{ds^*}{dt} - s^* = 1. \quad (44)$$

In the limit of negligible inertia, (Ω>>1), Eq. (44) becomes:

$$S^*\frac{ds^*}{dt} - s^* = 1, \quad (45)$$

which has the implicit solution:

$$t^* = s^* - \ln(s^* + 1). \quad (46)$$

This expression, when compared to equation (17), suggests that fluid inside an inverted capillary will advance through more quickly than fluid in an upright capillary (as expected).

In order to minimize the difference between these systems and realize orientation-independent behavior, a flow regime in which the effects of gravity on flow are negligible must be identified and operated in. That is, operation may be sought within a regime in which:

$$M \equiv \frac{t^*_{u,s} - t^*_{i,s}}{t^*_{u,s}} \times 100 \approx 0, \quad (47)$$

where $t^*_{u,s}$ is the time required for the upright capillary to reach position s, $t^*_{i,s}$ is the time required for the inverted capillary to reach this same position s, and M is the difference between the two times. From Eqs. (17) and (46), this condition is satisfied when:

$$s^* - \ln(1+s^*) \approx -s^* - \ln(1-s^*). \quad (48)$$

such that $$s^* \approx \frac{1}{2}\ln\left[\frac{1+s^*}{1-s^*}\right], \quad (49)$$

For small values of s*, the quotient 1+s*/1−s* becomes 2*+1 and ln [2 s*+1] becomes 2 s*. These limits suggest that, for small values of s*, the difference between the positions of the two interfaces will be approximately zero.

To test this hypothesis, FIG. 11 plots s* for both an upright and inverted capillaries as a function of t*. Data M, as defined in equation (47) may be superimposed over this. As suggested by equation (49), the difference M decreases with decreasing t*. Physically speaking, this result indicates that the hydrostatic force acting on the fluid front is initially negligible compared to the surface tension forces acting on the fluid front. After a monitoring period of t*=0.0005, s* inside the inverted indicator is 1.6% greater than s* in the upright indicator. This difference is equivalent to that realized by two identical vertical capillaries filled with the same oil, but exposed to temperatures of 300 K and 300.4 K. At t*=0.0015, the difference is about 3.7% (300 K versus 300.9 K). The difference between the two positions increases with increasing runtime. However, provided the maximum height realized at the end of the monitoring period remains small, the effects of gravity (and thereby orientation) on flow can be made sufficiently negligible.

Accordingly, some embodiments may be enabled to provide a non-powered, very long lived time-temperature indicator. Moreover, the time-temperature indicator may be relatively independent of orientation and may utilize a capillary tube that allows movement of a fluid through a capillary tube in only one direction so that the fluid front advances based on the time above a given temperature.

Many modifications and other embodiments set forth herein will come to mind to one of ordinary skill in the art to which these embodiments pertain having the benefit of the teachings presented in the foregoing descriptions and the associated drawings. Therefore, it is to be understood that the embodiments described herein are not to be limited thereto and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A time-temperature indication device comprising:
a first reservoir configured to receive a fluid therein; and
at least one capillary tube disposed proximate to the first reservoir to receive the fluid from the first reservoir responsive to changes in viscosity of the fluid based on changes in temperature, the at least one capillary tube restricting flow of the fluid out of the first reservoir into the capillary tube to enable fluid flow only in a single direction,
wherein the first reservoir is disposed between two air cavities such that opposing longitudinal ends of the first reservoir are opened to respective ones of the two air cavities.

2. The time-temperature indication device of claim 1, further comprising said fluid disposed in the first reservoir, wherein the at least one capillary tube comprises a plurality of capillary tubes.

3. The time-temperature indication device of claim 2, further comprising a second reservoir having the fluid disposed therein and wherein at least one of the capillary tubes is disposed proximate to each respective one of the first and second reservoirs.

4. The time-temperature indication device of claim 1, wherein the at least one capillary tube extends through one of the two air cavities and into the other one of the two air cavities.

5. The time-temperature indication device of claim 1, wherein the two air cavities have equalized pressures therein.

6. The time-temperature indication device of claim 1, wherein the first reservoir has a substantially 90 degree contact angle with both of the two air cavities.

7. The time-temperature indication device of claim 1, wherein a channel defining the at least one capillary tube is bent.

8. The time-temperature indication device of claim 1, wherein a channel defining the at least one capillary tube is straight.

9. The time-temperature indication device of claim 1, wherein a portion of a channel defining the at least one capillary tube that is proximate to the first reservoir is polished.

10. The time-temperature indication device of claim 1, wherein the device is sealed between coverings including a laminated material to protect internal portions of the device from pressure effects.

11. The time-temperature indication device of claim 1, wherein contact between the fluid and a channel defining the at least one capillary tube is initially prevented by an inhibitor.

12. The time-temperature indication device of claim 11, wherein the inhibitor is functionally removed by physical deformation of the inhibitor to enable the fluid to contact the channel.

13. The time-temperature indication device of claim 11, wherein the inhibitor is functionally removed by movement of the inhibitor via magnetic influence to enable the fluid to contact the channel.

14. The time-temperature indication device of claim 1, wherein the first reservoir is formed within a polymer substrate.

15. The time-temperature indication device of claim 1, wherein device operates independent of an orientation of the time-temperature indication device.

16. The time-temperature indication device of claim 1, wherein the at least one capillary tube has a capillary opening thereto of less than about 20 μm.

17. The time-temperature indication device of claim 1, wherein the device is unpowered.

18. A time-temperature indication device comprising:
a first reservoir configured to receive a fluid therein; and
at least one capillary tube disposed proximate to the first reservoir to receive the fluid from the first reservoir responsive to changes in viscosity of the fluid based on changes in temperature, the at least one capillary tube restricting flow of the fluid out of the first reservoir into the capillary tube to enable fluid flow only in a single direction,
the time-temperature indication device further comprising said fluid disposed in the first reservoir,
wherein the at least one capillary tube comprises a plurality of capillary tubes,
the time temperature indication device further comprising a second reservoir having a different fluid disposed therein than the fluid, and wherein at least one of the capillary tubes is disposed proximate to each respective one of the first and second reservoirs, the fluid and the different fluid each having different properties relative to temperature driven changes in viscosity to define different scales for time-temperature indication.

19. A time-temperature indication device comprising:

a first reservoir configured to receive a fluid therein; and at least one capillary tube disposed proximate to the first reservoir to receive the fluid from the first reservoir responsive to changes in viscosity of the fluid based on changes in temperature, the at least one capillary tube restricting flow of the fluid out of the first reservoir into the capillary tube to enable fluid flow only in a single direction, the time-temperature indication device further comprising said fluid disposed in the first reservoir, wherein the at least one capillary tube comprises a plurality of capillary tubes, and wherein at least one of the capillary tubes has different dimensions than at least another one of the capillary tubes to define corresponding different scales for time-temperature indication.

* * * * *